United States Patent [19]
Brafman et al.

[11] 3,798,455
[45] Mar. 19, 1974

[54] METHOD OF REMOTE ANALYSIS OF THE COMPOSITION OF A MEDIUM AND A DEVICE FOR CARRYING OUT SAID METHOD

[75] Inventors: Marek Brafman, St. Martin D'Heres; Alain Godeau, Pau; Jean Laverlochere, La Tronche; Jean-Luc Lecomte, Eghirolles, all of France

[73] Assignee: Commissariat A L'Energie Atomique, Paris, France

[22] Filed: Jan. 4, 1973

[21] Appl. No.: 320,954

[30] Foreign Application Priority Data
Jan. 21, 1972  France .................... 72.02095

[52] U.S. Cl. ........................... 250/256, 250/269
[51] Int. Cl. ............................................. G01t 1/16
[58] Field of Search ................. 250/256, 269, 270; 235/151.35

[56] References Cited
UNITED STATES PATENTS
3,733,474  5/1973  Edwards et al. ............... 235/151.35
3,562,501  2/1971  Mears ........................... 235/151.35

Primary Examiner—James W. Lawrence
Assistant Examiner—Davis L. Willis
Attorney, Agent, or Firm—Flynn & Frishauf

[57] ABSTRACT

An exciting pulse is transmitted from a probe location to a medium to be remotely analyzed, $n$ successive pulses of characteristic back-scattered radiation are detected and converted to $n$ successive voltage pulses which are detected, delayed and directed to a buffer store. The contents of the store channels are read successively and periodically, an electric pulse is formed in each channel and proportional in amplitude to its contents, the resultant periodic pulse train being transmitted to amplitude-analyzing elements which indicate the composition of the medium.

7 Claims, 7 Drawing Figures

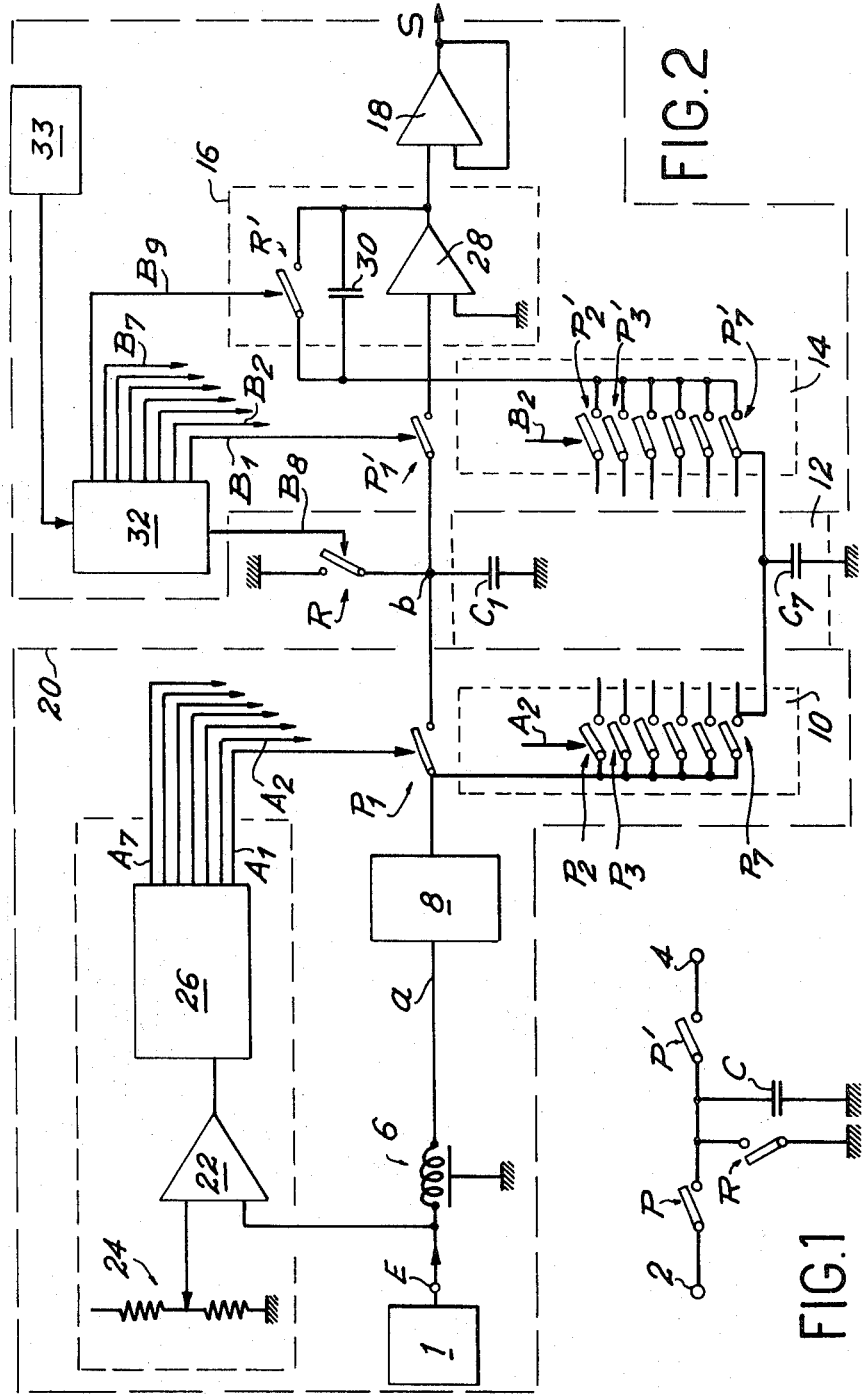

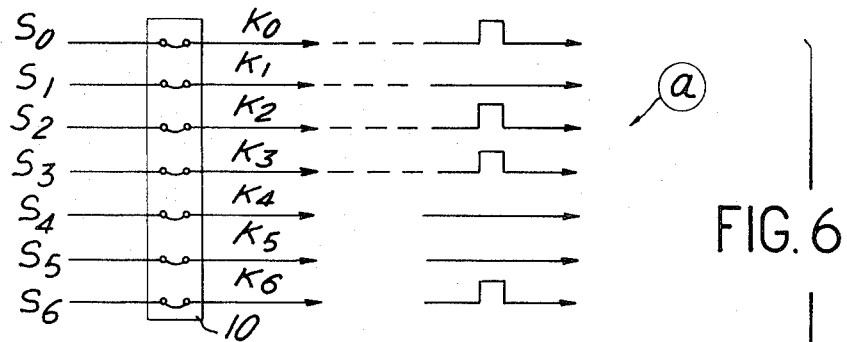
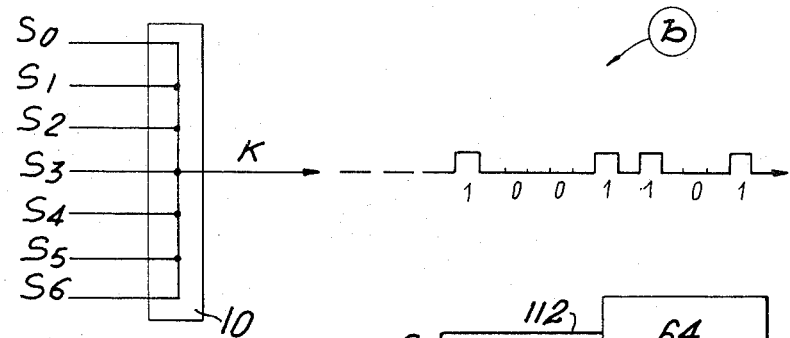
FIG.6
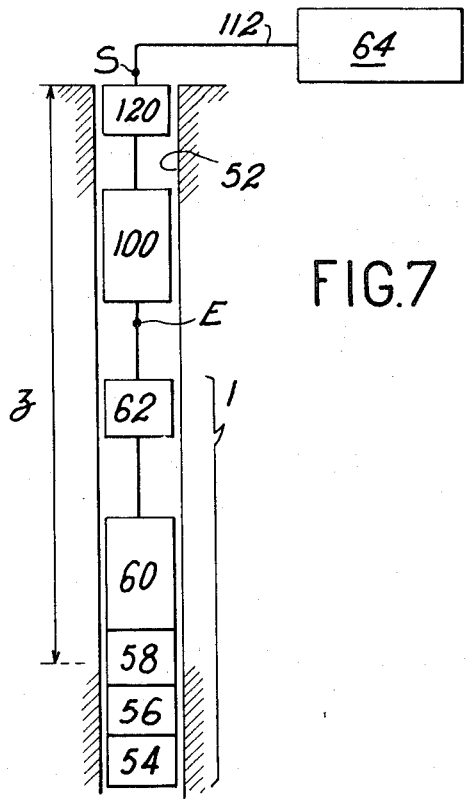
FIG.7

METHOD OF REMOTE ANALYSIS OF THE COMPOSITION OF A MEDIUM AND A DEVICE FOR CARRYING OUT SAID METHOD

This invention relates to a method of remote analysis of the composition of a medium and a device for carrying out said method. The invention finds an application especially in the detection and quantity determination in situ of the constituent elements of petroleum reservoirs.

One known method for performing the analysis of the chemical composition of a medium consists in detecting and analyzing the radiations which are back-scattered by said medium in response to an exciting radiation. Since each material is characterized by one particular radiation (nature, amplitude, duration), the analysis of radiations received permits detection and quantity determination of the materials which produce said radiation.

If the exciting radiation is a pulsed source, there is thus collected a series of n pulses which are usually random both in amplitude and in position. The rate of arrival of these pulses can be extremely high. In point of fact, processing of a signal which is generated in the form of a series of pulses requires a certain time. Whether this signal-processing operation consists of anaylsis or counting, the known devices which permit this operation all have a dead time. In consequence, if the rate of arrival of the pulses to be processed is too high, a certain number of these latter are not taken into account. To refer more specifically to the orders of magnitude, it can be stated that a conventional analytical device (for example a multichannel analyzer) has a dead time which is of the order of 10 microseconds. If two incident pulses are separated by a time interval of less than 10 microseconds, the second pulse will not be processed by a device of this type since it will arrive within the analyzer during the time of processing of the first pulse. This results in a loss of information which has the effect especially of impairing the accuracy or the rate of analysis.

It has already been proposed to store the information to be processed, then to restitute said information at a suitable and sufficiently low rate to permit processing at a frequency which is suited to devices of known types. By way of example, reference can be made to U.S. Pat. No. 3,435,224 in respect of "Downhole system for storing and reading-out detector signals for transmission to the surface at relatively low frequency" as granted on Mar. 25, 1969. In this patent, the memory employed is a counter which essentially comprises two bistable circuits. A memory of this type records the appearance of back-scattered pulses and counts these latter but does not retain the information relating to amplitude or surface which characterizes these pulses. By means of a storage device of this type, it is therefore impossible to restitute the characteristic of the incident pulses at a low frequency.

On the contrary and in accordance with the present invention, it is not considered sufficient to perform only a counting operation but the characteristics of the incident pulses are stored and then restituted at a chosen frequency in order to carry out a general analysis which determines the number of pulses of a predetermined type which have been received. The result of this analysis is therefore much more complete than the result obtained by means of devices of the prior art which operate only by counting the number of back-scattered pulses.

More precisely, the present invention relates to a method of remote analysis of the composition of a medium placed around a probe location, in which an exciting radiation pulse is emitted from said probe location in the direction of said medium, there are then detected $n$ successive pulses of back-scattered radiation from the medium which are characteristic of the composition of said medium, said $n$ pulses are converted to $n$ successive voltage pulses, characterized in that, in a first step:

the appearance of each voltage pulse is detected,
said pulses are delayed,
for each of the $n$ pulses and during the delay operation, an addressing signal is formed in order to direct each $n$ pulse towards one of the $n$ channels of a buffer store which contains a number of pulses $p$ greater than $n$, and in a second step:

the contents of the $p$ channels of the buffer store are read successively and periodically,
there is formed in each channel an electric pulse having an amplitude which proportional to the contents of the channel, thus generating a periodic train of $n$ pulses of non-zero amplitude,
said periodic pulse train is transmitted to elements for amplitude analysis of electric pulses, the result of said analysis being such as to indicate the composition of said medium,
the contents of the buffer store are reset to zero.

In an alternative embodiment which can advantageously be adopted, the method is characterized in that said train of $n$ periodic pulses is transmitted digitally by converting the amplitude of each pulse of said train to a binary digital signal and by transmitting said binary digital signal to the analyzing elements.

The present invention is also directed to a device for the remote analysis of the composition of a medium which carries out the method hereinbefore defined and comprises a probe constituted by an exciting-radiation generator, a back-scattered radiation detector connected to a converter which delivers $n$ voltage pulses having amplitudes proportional to the intensities of the $n$ detected pulses, characterized in that said probe is connected to an analytical device by means of a circuit which comprises in series: a writing circuit, a buffer store, a reading circuit and a shaping circuit:

said writing circuit comprises on the one hand a threshold discriminating circuit for detecting the appearance of a voltage pulse at the output of the converter, said discriminator being connected to a first address selector having $p$ outputs connected to the $p$ control inputs of $p$ switches of a first addressing circuit and intended to deliver on the appearance of the pulse of the order $i$ which is detected by the discriminator a signal for closing on the output of the order $i$; and on the other hand, in parallel with said discriminating circuit and said address selector, a delay line in series with a voltage-current converter, the output of which is connected in parallel with the $p$ switches of the first addressing circuit;

said buffer store is formed of $p$ capacitors in parallel each connected to one of the $p$ switches of the first addressing circuit;

said reading circuit comprises a second addressing circuit constituted by $p$ switches which are connected at one end to each of the $p$ capacitors of the buffer store and are connected at the other end in parallel with a shaping circuit, said switches each having a control lead, the $p$ control leads being connected to $p$ output leads of a second address selector controlled by a clock, said second address selector being further provided with an output lead of the order $p + 1$ which is connected to the control lead of a zero-resetting switch of the capacitors of the buffer store;

said shaping circuit is an integrating circuit with zero-resetting means which delivers voltage pulses to the analytical device via a transmission cable, the amplitudes of said voltage pulses being proportional to the charging voltages of the capacitors of the buffer store to which said circuit is connected sequentially and periodically.

In an alternative mode of application, the device is characterized in that it additionally comprises an analog-digital converter which is connected between said shaping circuit and said transmission cable.

The advantages and characteristic features of the invention will be more clearly brought out by the following description of exemplified embodiments which are given by way of explanation without any limitation being implied, reference being made to the accompanying drawings, in which:

FIG. 1 is a schematic diagram of the circuit which performs writing, storage and reading of the information to be processed;

FIG. 2 is a general circuit diagram of the device according to the invention;

FIG. 6 shows two ways of transmitting a digital signal along a cable to the analytical devices;

FIG. 7 is a schematic diagram of the general remote-analysis device.

Figure 3:
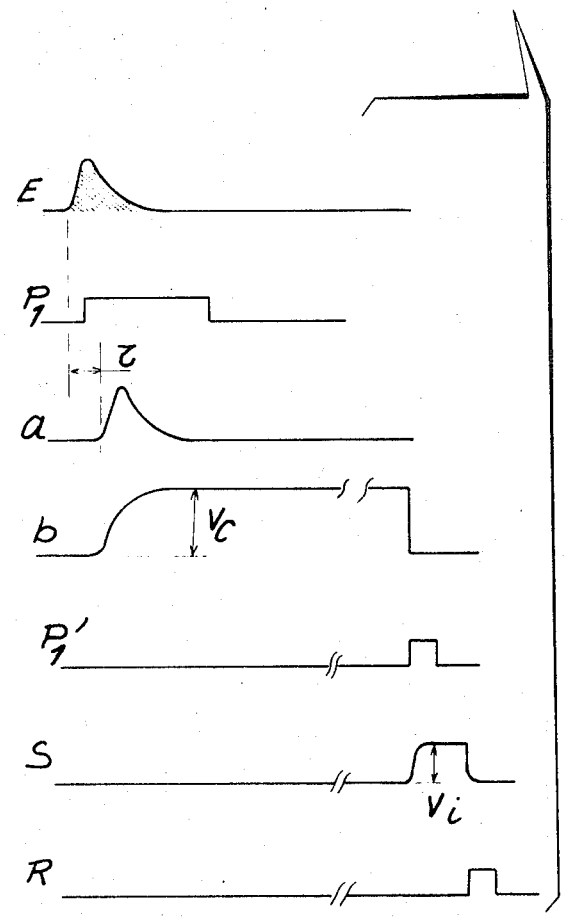
FIG. 3 is a diagram which illustrates the variation in voltages at certain points of the circuit shown in FIG. 2.

The schematic diagram of FIG. 1 shows the circuit which permits writing, storage and reading of a pulse characteristic. This circuit comprises three switches P, P' and R and a capacitor C. The input terminal of the circuit is designated by the reference numeral 2 and the output terminal is designated by 4. The principle of operation of this circuit is as follows: the random pulses, which may be converted to current pulses if the initial pulses are voltage pulses, arrive at the input terminal 2; the switch P is closed whilst the switches P' and R are open. The pulse which arrives at the input terminal 2 is therefore directed towards the capacitor C in which it is integrated; the switch P is opened and the capacitor C holds its charge. This constitutes the step which consists in writing in the channel formed by the capacitor C. The reading step is carried out by closing the switch P', thereby restituting on the output lead 4 a signal whose amplitude is a function of the signal stored in the capacitor C. When the signal which appears on the lead 4 has been processed by means of devices which are not illustrated, the switch R is closed and this has the effect of resetting to zero the contents of the capacitor C; the storage channel is thus ready to receive a further pulse which will be written, stored and read by means of the same operations as those which have just been described.

If the time interval which elapses between the instants of appearance of the random pulses on the lead 2 is shorter than the time-duration of the operations involved in storing, reading and resetting, it is necessary to make provision for $p$ storage channels, wherein $p$ is higher than the number $n$ of random pulses to be stored. The store must therefore be constituted by a plurality of $p$ channels associated on the one hand with a first addressing circuit which is located at the input of the store and intended to direct the incident pulses and, on the other hand, with a second addressing circuit which is located downstream of the store and permits restitution of the pulses.

In other words, the method according to the invention consists in storing the information relating to the random pulses in analog form and not only in counting the incident pulses as in the prior art, then in restituting said information at a low rate and in a periodic manner.

In FIG. 2, which provides a more detailed and precise diagram than in the preceding figure, the train of random voltage pulses is applied to the input terminal E of the probe 1. Said pulses are delayed by the delay line 6, then converted to current pulses by the converter 8; the current pulses are written, stored and read by means respectively of the first addressing circuit 10, the buffer store 12 and the second addressing circuit 14. The circuit 10 contains, for example, seven switches designated as $P_1$, $P_2$, $P_3$ ... $P_7$; similarly, the circuit 14 comprises seven switches designated as $P'_1$, $P'_2$, $P'_3$ ... $P'_7$; so far as concerns the storage channels of the memory or store, said channels are also seven in number and constituted by capacitors designated as $C_1$, $C_2$, $C_3$ ... $C_7$. The switch R is the common zero-resetting switch of the store channels. The circuit 20 serves to detect the appearance of the incident random pulses and to form addressing signals so as to direct said pulses into the different channels of the store 12 by means of the addressing circuit 10; the circuit 20 aforesaid comprises a discriminator 22 which is adjusted by the potentiometer 24 in order that it should not operate in response to the background noise and an address selector 26 having seven outputs $A_1$, $A_2$ ... $A_7$ which are connected to the seven control leads of the switches P of the circuit 10. The circuit 32 is a second address selector which is controlled by the clock 33; said circuit has seven output leads $B_1$, $B_2$ ... $B_7$ which are connected to the seven switches P'; said selector 32 determines the state of opening or closure of the switches P'. An eighth lead $B_8$ is connected to the zero-resetting switch R. Shaping of the output pulse is carried out by the output circuit 16 which is constituted by an operational amplifier 28, there being connected between the input and output terminals of said amplifier a capacitor 30 which can be short-circuited by means of a switch R', the state of which is controlled by the circuit 32 to which it is connected by means of the ninth output lead $B_9$. As is already known, the circuit 16 aforesaid is therefore an integrating circuit with resetting to zero. The operational amplifier 18 matches the impedance of the system with the impedance of the subsequent transmission line which is connected to the output S of the device. The points designated by $a$, $b$, are references which will be used for the purpose of describing the operation of this circuit.

Any amplifying circuits which may be provided in order to obtain a signal of suitable amplitude at the output S have not been shown in this schematic diagram for the sake of simplification. Similarly, the converter circuit 8 is not shown therein in detail since this latter is of known type (for example an operational amplifier which is associated with resistors having equal values and which converts a voltage to a proportional current). Likewise the switches P and P' are shown diagrammatically but it is readily apparent that this type of switch can be constituted in practice by transistor devices such as field-effect transistors, for example. In this case, the control lead of the switch is the transistor gate and the conducting or non-conducting state of the transistor depends on the voltage applied to the gate. The outputs $A_1$ to $A_7$ of the address selector 26 are accordingly connected to the gates of the seven transistors P; similarly, the seven outputs $B_1$ to $B_7$ of the address selector 32 are connected to the gates of the seven transistors P'. These address selectors 26 and 32 are not shown in detail since they are known to those who are versed in the art.

Figure 4:
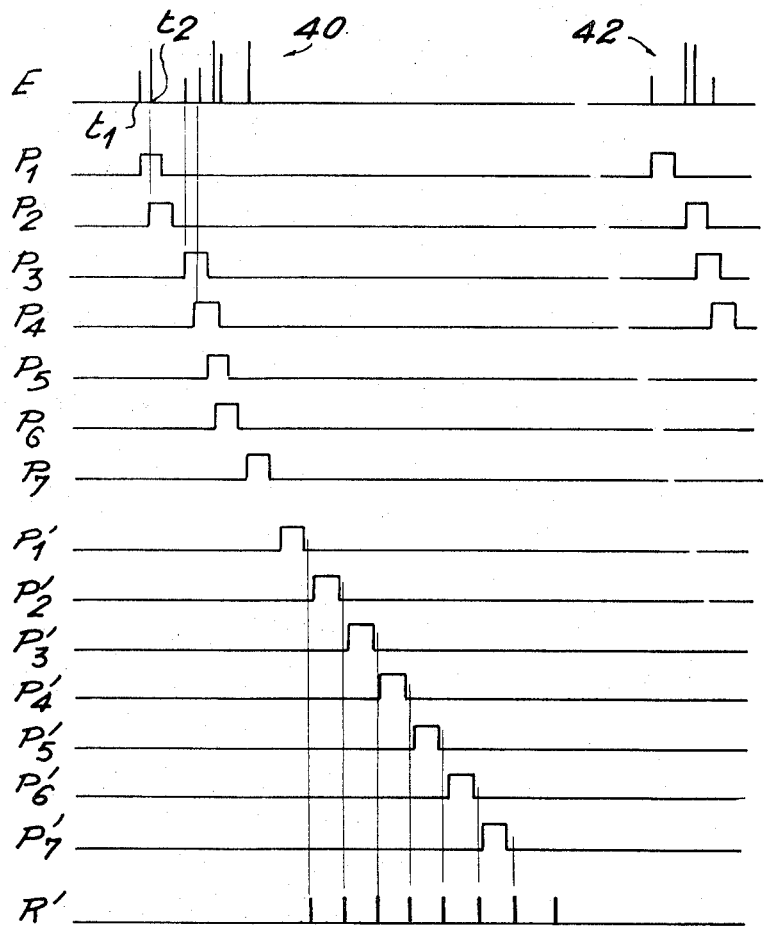
FIG. 4 is a diagram which illustrates the sequential control in the case of a store having seven channels.

In order that the device of FIG. 2 may be more readily understood, reference can usefully be made to FIGS. 3 and 4. There is shown in FIG. 3 a time diagram which illustrates the variation of the voltages at given points of the circuit of FIg. 2. The reference E represents the input of the circuit and the reference S represents its output; as in FIg. 1, the references $P_1$, $P'_1$ represent the two input and output addressing switches respectively of the first storage channel and R' represents the zero-resetting switch of the capacitor which appears in the integrating circuit 16; the point $a$ is located after the delay line 6 and the point $b$ is located on the plate of the capacitor $C_1$ which constitutes the first storage channel. The incident pulse shown at the top of FIG. 3 represents the first voltage pulse which appears on the input E of the device of FIG. 2. The arrival of said pulse is detected by the discriminator 22 which initiates closure of the switch $P_1$ (rectangular pulse of the line $P_1$) by means of the address selector 26. The incident pulse is thus directed towards the first channel of the store 12.

Since this addressing operation takes place during a non-zero time interval, it is necessary to delay the incident pulse in order to ensure that the switch $P_1$ should be closed when said pulse arrives at this latter; hence the presence of the delay line 6 which causes a time-delay having the notation $\tau$ in FIG. 3.

The circuit 8 converts the voltage pulse to a current pulse which is then directed towards the capacitor $C_1$ and integrated therein. There is therefore present at the terminals of the capacitor $C_1$ a voltage which has the shape represented on line $b$. Said voltage reaches a plateau $V_c$ which remains as long as the storage operation lasts. Reading of the contents of said channel is initiated by the selector 32 which delivers a rectangular voltage pulse on the lead $A_1$ and said pulse closes the switch $P'_1$, thereby transferring the charge of the capacitor $C_1$ to the integrating circuit 16; there is shown on the line S the permanent voltage $V_i$ which exists at the output of the integrating system 16 (or the voltage at the output S which is equivalent by reason of the fact that the amplifier 18 has a gain of unity) after transfer of the charge of $C_1$. This voltage is reduced to zero when the selector 32 transmits to the switch R' a signal which closes said switch (line R').

If $i(t)$ designates the current which appears after the converter circuit 8, the amplitude of the output voltage can be calculated after reading of the storage channel. In fact, the charge $Q_c$ which is stored in the capacitor $C_1$ is given by:

$$Q_c = \int_0^\infty i(t)dt$$

the charge voltage $V_c$ of the capacitor having a capacitance $C_1$ is therefore:

$$V_c = \frac{1}{C_1}\int_0^\infty i(t)dt$$

The charge $Q_c$ is then transferred to the integrating circuit 16 in which the capacitor 30 has a capacitance $C_i$. In consequence, there appears on the output lead of this stage a permanent voltage $V_i$ having the value $$V_i = C_1/C_i \times V_c$$

namely $$V_i = \frac{1}{C_i}\int_0^\infty i(t)dt.$$

The voltage $V_i$ is therefore proportional to the area of the current pulse which appears after the circuit 8 and therefore finally to the area of the voltage pulse which appears at the input E of the device (shaded area). Moreover, this voltage is independent of the capacitance of the storage capacitor $C_1$, thereby dispensing with any need to provide channels which are all identical.

The foregoing discussion has dealt with the manner in which the first incident pulse is processed in accordance with the invention. Consideration can now be given to the operations performed by the device of FIG. 2 in order to process the following pulses, reference being accordingly made to FIg. 4.

In this figure, the time is plotted as abscissae and the amplitude of the signals appearing either at the input E of the device or on the switches P and P' is plotted as ordinates. There are shown two trains of random pulses, namely the first train 40 which contains seven pulses and the second train 42 which only contains four pulses. The arrival of the first pulse at the instant $t_1$ induces, as explained earlier, a rectangular pulse which closes the switch $P_1$. This first incident pulse is directed into the first channel of the store in which it is integrated in the capacitor $C_1$. The appearance of the second pulse at the instant $t_2$ initiates closure of the switch $P_2$ in the same manner, with the result that this second pulse is directed into the second storage channel and so forth. The pulses which close the switches $P_1$, $P_2$ ... $P_7$ are therefore randomly positioned but of constant rectangular shape which is determined by the address selector 26.

In an alternative design of the addressing system, the switch $P_1$ is continuously closed prior to arrival of the pulse train; the arrival of the first pulse at the instant $t_1$ initiates with a time-delay the closure of the switch $P_2$ for the arrival of the second pulse and the opening of the switch $P_1$ and so on in sequence.

When it is desired to restitute the contents of the channels of the store 12, the selector 32 which is controlled by the clock 33 delivers a recurrent series of pulses which close the switches P+ of the circuit 14 as shown on the following lines of FIG. 4 which illustrate the state of said switches. There is shown in this figure a recurrent series of pulses which controls the successive closure of the switches $P'_1$, $P'_2$ etc. . . . $P'_7$ at the frequency of the clock 33. Since there is only one integrating circuit for forming the output pulse, the capacitor 30 should be reset to zero after each utilization of said circuit for one of the channels of the store. To this end, the switch R' which is placed in parallel with the capacitor 30 is closed periodically by reset pulses which appear on the line R' and are carried by the lead $B_9$. These pulses occur after the pulses which result in reading of the channels and precede the pulses which result in reading of the following channel. These reset pulses also determine the duration of the recurrent pulses which are restituted at the output of the device as has been seen in connection with FIG. 3 on line S. When the reading of the different channels has been carried out, a pulse for resetting all the capacitors of the store 12 is transmitted by the circuit 32 to the switch R via the lead $B_8$. This reset pulse is not shown in FIG. 4.

When the second pulse train 42 appears at the input of the device, the same process takes place, namely the formation of writing pulses which close the switches P sequentially, then the formation of reading pulses which permit periodic restitution of the contents of the different channels of the store. In the case of FIG. 4, it is assumed that the second pulse train 42 contains only four pulses. In this case, only four of the seven channels of the store 12 will be employed for storing the information. The three other channels will remain vacant, with the result that the reading pulses transmitted to the switches $P'_5$, $P'_6$ and $P'_7$ will not produce any voltage at the output of the device. It is therefore apparent that the number $p$ of channels to be provided for the store 12 must be at least equal to the number $n$ of pulses of the incident train.

In the embodiment which has just been described, there is transmitted a train of pulses having amplitudes representing analog values which are proportional to the information to be analyzed. The repetition frequency of the pulse train is that of the clock 33. This frequency is chosen so that the time interval which elapses between two consecutive pulses should be longer than the dead time of the analytical device. In another embodiment, the value is not transmitted in analog form but previously converted to a binary digital signal and this latter is transmitted to the analyzing elements. The analog-digital converter which carries out this conversion is interposed between the output S of the shaping circuit of FIG. 2 and the transmission cable.

Figure 5:
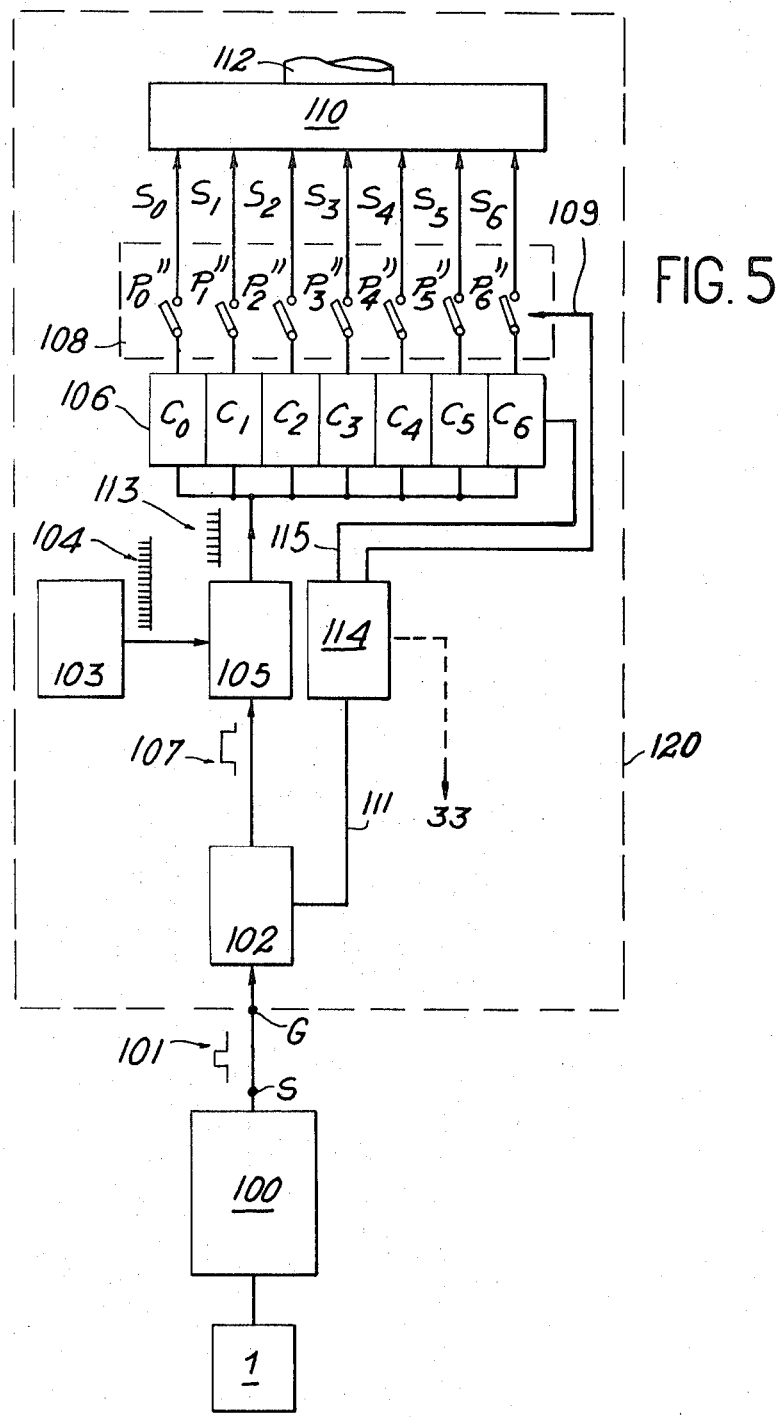
FIG. 5 is a schematic diagram of the analogdigital converter which can be employed in one alternative embodiment of the device.

A converter of this type is shown in FIG. 5 and comprises an input terminal G connected to the output S of the circuit 100 which is the circuit shown in FIG. 2; the analog pulse 101 derived from the circuit 100 is applied to said input. An amplitude-time converter 102 delivers a pulse 107 having a width which is proportional to the amplitude of the pulse 101; the pulse 107 and the pulses 104 derived from a clock 103 are applied to a logic AND-gate 105. A counter 106 comprises by way of example seven cells designated as $C_0$, $C_1$, $C_2$, . . . $C_6$. A reading circuit 108 is represented diagrammatically by seven switches $P''_0$, $P''_1$, $P''_2$ . . . $P''_6$ and a corresponding number of output leads $S_0$, $S_1$, $S_2$ . . . $S_6$. A connector 110 serves to connect said outputs to the transmission cable 112. A control circuit 114 which comprises in particular a clock and an address selector is connected to the converter 102 by means of the lead 111 and controls the reading element 108 by means of the lead 109 and the resetting of the cells of the counter 106 by means of the lead 115.

The operation of the circuit aforesaid is as follows: the rectangular pulse 107 derived from the converter 102 activates an AND-gate 105 to which the pulses 104 derived from the clock 103 are applied simultaneously; there is therefore present at the output of the logic gate 105 a series 113 of pulses, the number of which represents the amplitude of the pulse 101. The number of pulses which have passed through the gate 105 is counted in a conventional manner by means of the binary counter 106 which may consist of seven binary cells, although this is mentioned solely by way of example; the amplitude of the pulse is stored in the counter 106 in the form of a binary signal having seven digits. The reading circuit 108 serves to read the contents of the different cells of the counter 106 at a moment which is determined by the control circuit 114. Reading of the contents of the cells 106 is carried out as represented diagrammatically by closure of the switches $P''_0$, $P''_1$, $P''_2$, . . . $P''_6$ in the order determined by the address selector and at the frequency determined by the clock of the control circuit 114. After reading, the information contained in the counter 106 appears on the seven output leads $S_0$, $S_1$, . . . $S_6$ and, via the lead 110, at the input of the transmission cable 112.

The transmission of the contents of the counter 106 is illustrated in FIG. 6. In FIG. 6a, it is assumed that the cable which is employed for the transmission has a number of insulated electric conductors which is greater than the number of bits to be transmitted, that is to say in the case under consideration, greater than seven; the first seven conductors are designated by the references $K_0$, $K_1$, $K_2$, . . . $K_6$; in this alternative embodiment, each output lead $S_0$, $S_1$, . . . $S_6$ can be connected to one of the conductors K of the cable. These parallel connections are made by means of the connector 110.

On the contrary, it is assumed in FIG. 6b that the transmission cable only has one insulated conductor or, equivalently, a plurality of electric conductors connected in parallel. Under these conditions, the connector 110 joins all the output leads S to the single conductor K.

In the case of FIG. 6a, transmission of the contents of the counter 106 as shown in FIG. 2 can be effected very simply by closing simultaneously all the switches $P''_0$, $P''_1$, $P''_2$, . . . $P''_6$. This closure causes the appearance of voltage pulses solely on the conductors K which are associated with cells having a logic state 1, namely, in the case given by way of example in FIG. 6, the cells $C_0$, $C_2$, $C_3$ and $C_6$ which correspond to the conductors $K_0$, $K_2$, $K_3$ and $K_6$. These conductors therefore permit the transmission of a pulse having a duration which depends on the time of closure of the switches $P''$ and an amplitude which depends on the cells of the counter 106 and possibly also on amplifiers which are not illustrated. The whole attraction of this alternative embodiment lies in the fact that all the information contained in the counter 106 can be transmitted in parallel and this consequently permits a very high rate of transmission of information.

On the contrary, in the case of FIG. 6b, reading of the contents of the counter 106 is performed sequentially by successive closure of the switches P''. This is shown on the right-hand side of FIG. 6b in which the pulse train represents the contents of the cells of the counter 106. The precise form of said pulse train depends on the sequential circuit contained in the control element 114; in FIG. 6b, said train is in the form of a pulsed signal with resetting to zero between two pulses but this is not intended to imply any limitation of the invention. In this case also, said signal represents in binary language the contents of the counter, namely 1011001, namely 77 in decimal notation. In this alternative form, the duration of reading of the contents of the counter 106 is naturally much longer than the duration which corresponds to the case of FIG. 6a. Nevertheless, even in the case just mentioned, it is possible by means of this alternative embodiment to transmit information at a much higher speed than would be the case with a digital transmission process which would entail the need to transmit 77 pulses. In accordance with the invention, it is in fact necessary to transmit a maximum number of seven pulses separated by seven time intervals and a synchronization bit which is not shown in FIGS. 6a and 6b, namely a total of 15 intervals having a logical level of 0 or 1.

The foregoing description does not specifically mention a certain number of circuits which do not really characterize the invention and which are in any case known to those who are skilled in the art. It is thus evident that, after reading the counter 106, a circuit must be provided for resetting to zero the contents of the different cells of said counter. Resetting can be performed, for example, by means of elements contained in the circuit 114 and by means of the lead 115.

Determination of the instant of reading with respect to the instant of arrival of the pulse has also been omitted from the foregoing; this determination can be made from the clock contained in the circuit 114 and after a predetermined time-delay from the instant of arrival of the analog pulse. Said instant of arrival can be detected by a circuit which is not shown in the figure but can be in the form of a discriminator, for example. However, since the pulse train 101 is recurrent, a circuit of this type can be dispensed with and replaced by a circuit 114 for the purpose of reading the counter 106. Said circuit 114 is controlled by the clock 33 which establishes the recurrence frequency of the pulse train. Finally, it is wholly apparent to any one versed in the art that the transmission of the digital signal must comprise, in addition to the pulse train (parallel or series) shown in FIG. 6a or 6b, synchronization bits which serve to receive said trains and to extract information therefrom. Said synchronization bits can be formed from the circuit 114.

It is clear that the analog - to - digital converter device as hereinabove proposed does not have an infinitely short response time. In order that all incident pulses may be processed, it is therefore necessary to ensure that the rate of arrival of the analog pulses to be converted is not higher in inverse ratio to the dead time of the general converter system. This is obtained by adjusting the frequency of the clock 33 which determines the rate of arrival of the pulses.

If the amplitude analyzer is of the multichannel digital selector type, the transmitted digital signal directly constitutes the address of the channel in which the pulse is to be counted. This arrangement is particularly advantageous since it permits the possibility on the one hand of avoiding any need to employ at the surface an analog-digital converter associated with the analyzer and, on the other hand of deriving benefit from the advantages inherent in digital transmission which is less subject to non-linearities, to distortions, to attenuations along a cable which can consequently have low electrical performances.

In FIG. 7, the complete analytical device is shown in the case of a probe which operates by neutron activation and permits detection and quantity determination in situ of the constituent elements of petroleum reservoirs. In this figure, a probe 1 is placed within a bore hole 52 at a depth of exploration $z$ with respect to the land surface; said probe is constituted in known manner by a pulsed neutron generator 54, a protective screen 56, a scintillate 59 and a photomultiplier 60; the signals derived from the probe are previously processed (amplified in particular) by the circuit 62. Voltage pulses having irregular positions and amplitudes therefore appear on the output 62 at a rate which can be of a very high order. These pulses are grouped together in trains which correspond to the different "bursts" of neutrons emitted by the generator 54. Said pulses always have the same wave-form resulting from the excitation of the scintillator by an incident photon which then results in fluorescence, the intensity of which decreases exponentially. The spectrometry of these pulses consists in counting the number of pulses which have a predetermined peak amplitude. This analysis is performed by the element 64 which can be a multichannel selector, for example. Since the shape of the pulses derived from the probe is always the same, the same result is achieved by processing either the amplitude proper or the pulse area which is proportional thereto. The circuit 100 serves to store the information relating to the amplitude of the different pulses, then to restitute this information towards the analog-digital converter 120 and this latter directs the digital signal towards the analyzer 64 via the cable 112 which, as mentioned earlier, can have low electrical performances. If the dead time of the analyzer 64 is of the order of 10 microseconds as was initially supposed, it is necessary only to restitute the pulses with a recurrence frequency higher than 10 microseconds in order that all the pulses derived from the probe should be processed by the analyzer 64. The method and the device according to the invention therefore make it possible to obtain faster and more general spectrometry than is the case with systems of the prior art, in particular through ground strata in which the number of photons detected is high. In the case of petroleum bore holes of substantial depth, they are indispensable for the purpose of reducing times of analysis to economically feasible values.

What we claim is:

1. A method of remote analysis of the composition of a medium placed around a probe location, in which an exciting radiation pulse is emitted from said probe location in the direction of said medium, there are then detected $n$ successive pulses of back-scattered radiation from the medium which are characteristic of the composition of said medium, said $n$ pulses are converted to $n$ successive voltage pulses, wherein, in a first step:

the appearance of each voltage pulse is detected,
said pulses are delayed,
for each of the $n$ pulses and during the delay operation, an addressing signal is formed in order to direct each $n$ pulse towards one of the $n$ channels of a buffer store which contains a number of pulses $p$ greater than $n$, and in a second step:

the contents of the p channels of the buffer store are read successively and periodically,
there is formed in each channel an electric pulse having an amplitude which is proportional to the contents of the channel, thus generating a periodic train of $n$ pulses of non-zero amplitude,
said periodic pulse train is transmitted to elements for amplitude analysis of electric pulses, the result of said analysis being such as to indicate the composition of said medium,
the contents of the buffer store are reset to zero.

2. A method according to claim 1, wherein said train of $n$ periodic pulses is transmitted digitally by converting the amplitude of each pulse of said train to a binary digital signal and by transmitting said binary digital signal to the analyzing elements.

3. A method according to claim 2, wherein said binary digital signal representing the amplitude of a pulse represents the address of the channel of an analyzer of the multichannel digital selector type in which the corresponding pulse is intended to be counted.

4. A device for carrying out remote analysis of the composition of a medium, comprising a probe constituted by an exciting-radiation generator, a backscattered radiation detector connected to a converter which delivers $n$ voltage pulses having amplitudes proportional to the intensities of the $n$ detected pulses, wherein said probe is connected to an analytical device by means of a circuit which comprises in series: a writing circuit, a buffer store, a reading circuit and a shaping circuit:

said writing circuit comprises on the one hand a threshold discriminating circuit for detecting the appearance of a voltage pulse at the output of the converter, said discriminating circuit being connected to a first address selector having $p$ outputs connected to the $p$ control inputs of $p$ switches of a first addressing circuit and intended to deliver on the appearance of the pulse of the order i which is detected by the discriminator a signal for closing on the output of the order $i$; and on the other hand, in parallel with said discriminating circuit and said address selector, a delay line in series with a voltage-current converter, the output of which is connected in parallel with the $p$ switches of the first addressing circuit;

said buffer store is formed of $p$ capacitors in parallel each connected to one of the $p$ switches of the first addressing circuit;

said reading circuit comprises a second addressing circuit constituted by $p$ switches which are connected at one end to each of the $p$ capacitors of the buffer store and are connected at the other end in parallel with a shaping circuit, said switches each having a control lead, the $p$ control leads being connected to $p$ output leads of a second address selector controlled by a clock, said second address selector being further provided with an output lead of the order $p + 1$ which is connected to the control lead of a zero-resetting switch of the capacitors of the buffer store;

said shaping circuit is an integrating circuit with zero-resetting means which delivers voltage pulses to the analytical device via a transmission cable, the amplitudes of said voltage pulses being proportional to the charging voltages of the capacitors of the buffer store to which said circuit is connected sequentially and periodically.

5. A device according to claim 4, wherein the period of the clock which controls said second address selector is greater than the dead time of the analytical device.

6. A device according to claim 4, wherein said device further comprises an analog-digital converter which is connected between said shaping circuit and said transmission cable.

7. A device according to claim 6, wherein said analog-digital converter comprises a counter in which each binary cell is connected to one of the insulated conductors of the transmission cable.

* * * * *

UNITED STATES PATENT OFFICE
CERTIFICATE OF CORRECTION

Patent No. 3798455         Dated  March 19, 1974

Inventor(s) (1)Marek BRAFMAN (2)Alain GODEAU (3)Jean LAVERLOCHERE
            (4) Jean Luc LECOMTE It is certified that error appears in the above-identified patent and that said Letters Patent are hereby corrected as shown below:

In the heading on the cover page, correct the designation "Assignee" as follows:

Assignees: Commissariat à L'Energie Atomique,
           Paris, France, and Entreprise De
           Recherches Et D'Activités Pétrolières
           ELF, Paris, France.

Signed and sealed this 1st day of October 1974.

(SEAL)
Attest:

McCOY M. GIBSON JR.                C. MARSHALL DANN
Attesting Officer                  Commissioner of Patents